US012623490B2

(12) United States Patent
Lee et al.

(10) Patent No.: US 12,623,490 B2
(45) Date of Patent: May 12, 2026

(54) ADHESIVE COMPOSITION FOR TIRE CORD, TIRE CORD, AND TIRE

(71) Applicant: KOLON INDUSTRIES, INC., Seoul (KR)

(72) Inventors: Sung Gyu Lee, Seoul (KR); Il Chung, Seoul (KR); Ok Hwa Jeon, Seoul (KR); Min Ho Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 1003 days.

(21) Appl. No.: 17/773,604

(22) PCT Filed: Apr. 9, 2021

(86) PCT No.: PCT/KR2021/004456
§ 371 (c)(1),
(2) Date: Apr. 30, 2022

(87) PCT Pub. No.: WO2021/206491
PCT Pub. Date: Oct. 14, 2021

(65) Prior Publication Data
US 2022/0388341 A1 Dec. 8, 2022

(30) Foreign Application Priority Data

Apr. 9, 2020 (KR) ........................ 10-2020-0043566
Apr. 8, 2021 (KR) ........................ 10-2021-0045707

(51) Int. Cl.
| | |
|---|---|
| *B60C 9/00* | (2006.01) |
| *C09J 125/10* | (2006.01) |
| *C09J 139/08* | (2006.01) |
| *C09J 147/00* | (2006.01) |
| *D02G 3/48* | (2006.01) |
| *D06M 15/55* | (2006.01) |
| *D06M 15/564* | (2006.01) |
| *D06M 15/693* | (2006.01) |
| *D06M 101/32* | (2006.01) |

(52) U.S. Cl.
CPC .......... *B60C 9/0042* (2013.01); *C09J 125/10* (2013.01); *C09J 139/08* (2013.01); *C09J 147/00* (2013.01); *D02G 3/48* (2013.01); *D06M 15/55* (2013.01); *D06M 15/564* (2013.01); *D06M 15/693* (2013.01); *D06M 2101/32* (2013.01); *D10B 2331/04* (2013.01); *D10B 2505/022* (2013.01)

(58) Field of Classification Search
None
See application file for complete search history.

(56) References Cited

U.S. PATENT DOCUMENTS

| | | | | |
|---|---|---|---|---|
| 3,628,992 | A * | 12/1971 | McKillip | C08G 18/701 |
| | | | | 524/510 |
| 3,876,457 | A | 4/1975 | Adams | |
| 3,940,544 | A * | 2/1976 | Marshall | B29D 30/40 |
| | | | | 427/418 |
| 9,394,647 | B2 | 7/2016 | Ikeda | |
| 10,145,034 | B2 | 12/2018 | Bas | |
| 2003/0158317 | A1* | 8/2003 | Schaal | C08L 21/00 |
| | | | | 524/451 |
| 2014/0020809 | A1 | 1/2014 | Yokokura | |
| 2019/0085200 | A1* | 3/2019 | Jordan | C08G 18/2875 |
| 2020/0010741 | A1 | 1/2020 | Kim | |

FOREIGN PATENT DOCUMENTS

| | | | |
|---|---|---|---|
| CN | 102414362 A | 4/2012 | |
| CN | 105051284 A | 11/2015 | |
| CN | 106634778 A | 5/2017 | |
| CN | 108473824 A | 8/2018 | |
| CN | 110520495 A | 11/2019 | |
| EP | 0356970 A2 | 3/1990 | |
| EP | 1491365 A2 | 12/2004 | |
| EP | 2426253 A1 | 3/2012 | |
| EP | 2989243 A2 | 10/2014 | |
| JP | H04314719 A | 11/1992 | |
| JP | H05140405 A | 6/1993 | |
| JP | H08259744 A | 10/1996 | |
| JP | 09111050 A | 4/1997 | |
| JP | 2001-064620 A | 3/2001 | |
| JP | 2013-023668 A | 2/2013 | |
| JP | 2020-506994 A | 3/2020 | |
| JP | 2021531391 A | 11/2021 | |
| KR | 1020060016536 A | 2/2006 | |
| KR | 1020120023706 A | 3/2012 | |
| KR | 101719190 B1 | 3/2017 | |
| KR | 1020180110986 A | 10/2018 | |
| WO | 2010-125992 A1 | 11/2010 | |
| WO | WO-2018182229 A1 * | 10/2018 | B05D 1/18 |

OTHER PUBLICATIONS

International Search Report dated Jul. 22, 2021.
TW Search Report.

* cited by examiner

*Primary Examiner* — Megan McCulley
(74) *Attorney, Agent, or Firm* — Harvest IP Law, LLP

(57) ABSTRACT

This invention relates to an adhesive composition for a tire cord, a tire cord including an adhesive layer formed from the adhesive composition, and a tire including the tire cord. According to the present disclosure, an environment-friendly adhesive composition for a tire cord that can not only improve adhesive strength between tire rubber and a tire cord, but can also improve strength of a tire cord is provided.

12 Claims, No Drawings

ADHESIVE COMPOSITION FOR TIRE CORD, TIRE CORD, AND TIRE

CROSS REFERENCE TO RELATED APPLICATION(S)

This application is a National Stage of International Application No. PCT/KR2021/004456 filed on Apr. 9, 2021 claiming the benefit of Korean Patent Application No. 10-2020-0043566 filed on Apr. 9, 2020, and Korean Patent Application No. 10-2021-0045707 filed on Apr. 8, 2021 in the Korean Intellectual Property Office, each of which is incorporated herein by reference in its entirety.

TECHNICAL FIELD

This invention relates to an adhesive composition for a tire cord, a tire cord including an adhesive layer formed from the adhesive composition, and a tire including the tire cord.

BACKGROUND OF ART

In order to reinforce the strength of rubber structures, fiber reinforcing materials are used.

For example, in rubber tires, polyester fiber, polyamide fiber, aromatic polyamide fiber, polyvinyl alcohol fiber, and the like may be used as reinforcing materials.

In some cases, adhesion between fiber and rubber is not good according to the fiber, and thus, an adhesive is coated on the surface of the fiber to supplement adhesion between the fiber and the rubber.

For example, in order to improve adhesive strength between a raw cord for a tire cord and tire rubber, the adhesive is coated on the polyester fiber.

In general, in the adhesive composition for the above purpose, rubber (or latex) including resorcinol-formaldehyde (hereinafter, referred to as "RF") or a component derived therefrom is included.

However, as RF resin is harmful to the human body and the environment, its use is being strictly regulated. Thus, studies on adhesive compositions that do not include RF resin are being constantly progressed.

The adhesive composition may be provided on the fiber reinforcing material by dipping or spraying. Not only should the adhesive composition have appropriate flowability, but also the solid contents should be uniformly dispersed, so that property improvement effects according to the adhesive composition may be sufficiently and uniformly exhibited.

Meanwhile, although the adhesive composition improves adhesive strength between the fiber reinforcing material and tire rubber, stiffness of the fiber reinforcing material may be changed due to the adhesive composition. In case stiffness of the fiber reinforcing material increases more than needed, strength of the fiber reinforcing material may decrease, and as a result, the properties of a tire including the same may be deteriorated.

DETAILED DESCRIPTION OF THE INVENTION

Technical Problem

It is an object of the invention to provide an environment-friendly adhesive composition for a tire cord that can not only improve adhesive strength between tire rubber and the tire cord, but also improve strength of the tire cord.

It is another object of the invention to provide a tire cord having high adhesive strength and improved strength.

It is yet another object of the invention to provide a tire including the tire cord.

Technical Solution

Hereinafter, an adhesive composition for a tire cord, a tire cord, and a tire according to the embodiments of the invention will be explained in detail.

Technical terms in the present specification are only for mentioning specific embodiments, and they are not intended to restrict the invention unless there is a particular mention about them.

A singular expression includes a plural expression thereof, unless it is expressly stated or obvious from the context that such is not intended.

As used herein, the terms "comprise" or "have", etc. are intended to designate the existence of practiced characteristics, numbers, steps, constructional elements, or combinations thereof, and they are not intended to preclude the possibility of existence or addition of one or more other characteristics, numbers, steps, constructional elements, or combinations thereof.

According to the results of continued studies of the inventors, a reaction product between an epoxy resin and a diol compound has a large molecule size compared to the original epoxy resin, and has a relatively high soft segment rate in the molecule. Thus, an adhesive composition for a tire cord including the reaction product may be applied to any fiber substrate to provide excellent adhesive strength and appropriate stiffness, and enable realization of improved strength.

According to one embodiment of the invention, there is provided an adhesive composition for a tire cord, including:

a reaction product of an epoxy resin and a diol compound;
an isocyanate compound;
latex;
a water-dispersed polyurethane;
an amine compound; and
a solvent.

The adhesive composition for a tire cord does not include the RF resin, and thus, it does not induce environmental pollution and enables improvement in a working environment.

In the adhesive composition for a tire cord, a reaction product of an epoxy resin and a diol compound is included.

The reaction product of an epoxy resin and a diol compound has epoxy functional groups, thus improving reactivity and adhesion of the adhesive composition. The reaction product forms a three-dimensional network structure in the adhesive layer (or coating layer) formed by the adhesive composition together with an isocyanate compound described below, thus improving adhesive strength and stability.

Particularly, the reaction product of the epoxy resin and the diol compound has a large molecular size compared to the original epoxy resin, but has a relatively high soft segment rate in the molecule. Thus, the reaction product allows the adhesive composition to be applied to any fiber substrate to exhibit excellent adhesive strength and appropriate stiffness.

Herein, the soft segment means a segment including carbon-carbon chains introduced in the molecule of the reaction product from the diol compound. A hard segment means a segment formed by the epoxy functional group and isocyanate compound described below.

A fiber reinforcing material to which epoxy resin having a relatively high hard segment rate in the molecule is applied may exhibit excessive stiffness, thus inducing deterioration of strength of the tire cord.

According to one example, the reaction product may be obtained by the reaction of the epoxy resin and the diol compound at the weight ratio of 1:0.1 to 1:5.

Preferably, the reaction product may be obtained by the reaction of the epoxy resin and the diol compound at the weight ratio of 1:0.1 or more, or 1:0.5 or more; and 1:5.0 or less, or 1:4.5 or less, or 1:4.0 or less, or 1:3.5 or less, or 1:3.0 or less.

Specifically, the reaction product may be obtained by the reaction of the epoxy resin and diol compound at the weight ratio of 1:0.1 to 1:5.0, or 1:0.1 to 1:4.5, or 1:0.1 to 1:4.0, or 1:0.1 to 1:3.5, or 1:0.1 to 1:3.0, or 1:0.5 to 1:5.0, or 1:0.5 to 1:4.5, or 1:0.5 to 1:4.0, or 1:0.5 to 1:3.5, or 1:0.5 to 1:3.0.

In order for the reaction product to have a high soft segment rate in the molecule, it is preferable that the diol compound is used at the weight ratio of 1:0.1 or more, based on the epoxy resin.

However, if the diol compound is used in an excessive amount, an epoxy equivalent of the reaction product may decrease, and thus, adhesion of the adhesive composition may be deteriorated. And, if the diol compound is used in an excessive amount, the molecular weight of the reaction product may increase excessively, and thus, adhesion of the adhesive composition may be deteriorated. Thus, it is preferable that the diol compound is used at the weight ratio of 1:5.0 or less, based on the epoxy resin.

It is preferable that the reaction product of the epoxy resin and the diol compound has a weight average molecular weight (Mw) of 700 to 1200 g/mol, or 700 to 1150 g/mol, or 730 to 1150 g/mol.

As used herein, a weight average molecular weight means a weight average molecular weight of polystyrene conversion measured by a GPC method. In the process of measuring the weight average molecular weight of polystyrene conversion measured by GPC, commonly known analysis equipment, detectors such as a refractive index detector and an analysis column may be used, and commonly applied temperature conditions, solvents, and flow rates may be applied.

As specific examples of the measurement conditions, a polymer resin such as a polyurethane resin is dissolved in tetrahydrofuran (THF) to the concentration of 1.0 (w/w) % (about 0.5 (w/w) %, based on solid contents), and filtered using a syringe filter having a pore size of 0.45 μm, and then 20 μl of the solution is introduced in GPC. And, as the mobile phase of GPC, tetrahydrofuran (THF) is used and introduced at the flow rate of 1.0 mL/min, and as columns, 1 Agilent PLgel 5 μm Guard (7.5×50 mm) and 2 Agilent PLgel 5 μm Mixed D (7.5×300 mm) are connected in series, and as a detector, an Agilent 1260 Infinity II System RI Detector is used, and measurement temperature is 40° C.

Polystyrene standard samples (STD A, B, C, D) prepared by dissolving polystyrenes of various molecular weights in tetrahydrofuran at the concentration of 0.1 (w/w) % are filtered with a syringe filter having a pore size of 0.45 μm, and introduced in GPC, thus forming a calibration curve, which may be used to calculate the weight average molecular weight (Mw) of the polymer.

STD A (Mp): 791,000/27,810/945
STD B (Mp): 282,000/10,700/580
STD C (Mp): 126,000/4430/370
STD D (Mp): 51,200/1920/162

According to one example, the reaction product of the epoxy resin and the diol compound may be included in the adhesive composition for a tire cord in the content of 0.5 to 10.0 wt %.

Preferably, the reaction product may be included in the content of 0.5 wt % or more, or 1.0 wt % or more; and 10.0 wt % or less, 5.0 wt % or less, or 4.5 wt % or less, or 4.0 wt % or less, or 3.5 wt % or less, or 3.0 wt % or less, based on the total weight of the adhesive composition.

Specifically, the reaction product may be included in the content of 0.5 to 10.0 wt %, or 0.5 to 5.0 wt %, or 0.5 to 4.5 wt %, or 0.5 to 4.0 wt %, or 0.5 to 3.5 wt %, or 0.5 to 3.0 wt %, or 1.0 to 10.0 wt %, or 1.0 to 5.0 wt %, or 1.0 to 4.5 wt %, or 1.0 to 4.0 wt %, or 1.0 to 3.5 wt %, or 1.0 to 3.0 wt %, based on the total weight of the adhesive composition.

In order to prevent a decrease in the reactivity and cross-linking degree of the adhesive composition, it is preferable that the reaction product is included in the content of 0.5 wt % or more, based on the total weight of the adhesive composition.

However, if the reaction product is used in an excessive amount, due to excessive reactivity, the degree of cure of the adhesive composition may increase, and thus, the adhesive strength of an adhesive layer formed by the adhesive composition may be deteriorated. Thus, it is preferable that the reaction product is included in the content of 10.0 wt % or less, based on the total weight of the adhesive composition.

The kind of the epoxy resin is not specifically limited, and those commonly used in the technical field to which the invention pertains may be used.

As non-limiting examples, the epoxy resin may include one or more selected from the group consisting of a bisphenol-based epoxy resin, a novolac-based epoxy resin, and an oxazolidone-based epoxy resin. The bisphenol-based epoxy resin may be a bisphenol A type of epoxy resin, a bisphenol F type of epoxy resin, and the like. The novolac-based epoxy resin may be a novolac type of epoxy resin, a cresol novolac type of epoxy resin, and the like. And, as the epoxy resin, a commercially available epoxy resin, such as EX614B from NAGASE, KETL6000 from Kolon, CL16 from Ipox Chemical, GE500 from Raschig, and the like may be used.

The epoxy resin may have an epoxy equivalent of 120 to 600, considering the reactivity and the adhesion property of the adhesive composition, and the like.

As the diol compound, linear or branched aliphatic diol compounds having a carbon number of 3 to 8 may be preferably used.

As non-limiting examples, the diol compound may include one or more selected from the group consisting of 1,3-propanediol, 1,4-butanediol, 1,3-butanediol, 2,3-butanediol, and 1,6-hexanediol.

Meanwhile, in the adhesive composition for a tire cord, an isocyanate compound is included.

The isocyanate compound functions as a cross-linking agent.

The isocyanate compound reacts with the reaction product to form a three-dimensional network structure in the adhesive layer (coating layer) formed by the adhesive composition, thereby improving the adhesive strength and stability of the adhesive layer (or coating layer).

The isocyanate compound may be an isocyanate compound having a phenyl group. Specifically, the isocyanate compound may include one or more selected from the group consisting of methylene diphenyl diisocyanate (MDI), toluene diisocyanate (TDI), and hexamethylene diisocyanate (HDI).

And, as the isocyanate compound, a blocked isocyanate may be used. The blocked isocyanate compound may be prepared by the reaction of adding a known blocking agent to a polyisocyanate compound.

As such a blocking agent, phenols, such as phenol, thiophenol, chlorophenol, cresol, resorcinol, p-sec-butylphenol, p-tert-butylphenol, p-sec-amylphenol, p-oc-tylphenol, and p-nonylphenol; secondary or tertiary alcohols such as isopropyl alcohol, tert-butyl alcohol, and the like; aromatic secondary amines such as diphenylamine, xylidine, and the like; imides such as phthalic acid; lactams such as δ-valerolactam and the like; caprolactams such as ε-capro-lactam; active methylene compounds such as malonic acid dialkyl ester, acetylacetone, acetoacetic acid alkyl ester, and the like; oximes such as acetoxime, methyl ethyl ketoxime, cyclohexanone oxime, and the like; and basic nitrogen compounds such as 3-hydroxypyridine, acidic sodium sulfite, and the like may be used.

More specifically, commercially available water-dis-persed blocked products, such as IL-6 from EMS, DM-6500 from MEISEI Chemical, and the like, may be used as isocyanate.

According to one example, the isocyanate compound may be included in the adhesive composition for a tire cord in the content of 1.0 to 20.0 wt %.

Preferably, the isocyanate compound may be included in the content of 1.0 wt % or more, or 2.0 wt % or more, or 3.0 wt % or more; and 20.0 wt % or less, or 18.0 wt % or less, or 16.0 wt % or less, or 15.0 wt % or less, or 14.0 wt % or less, or 12.0 wt % or less, or 10.0 wt % or less, based on the total weight of the adhesive composition.

Specifically, the isocyanate compound may be included in the content of 1.0 to 20.0 wt %, or 1.0 to 18.0 wt %, or 1.0 to 16.0 wt %, or 1.0 to 14.0 wt %, or 1.0 to 12.0 wt %, or 1.0 to 10.0 wt %, or 2.0 to 20.0 wt %, or 2.0 to 18.0 wt %, or 2.0 to 16.0 wt %, or 2.0 to 14.0 wt %, or 2.0 to 12.0 wt %, or 2.0 to 10.0 wt %, or 3.0 to 20.0 wt %, or 3.0 to 18.0 wt %, or 3.0 to 16.0 wt %, or 3.0 to 14.0 wt %, or 3.0 to 12.0 wt %, or 3.0 to 10.0 wt %, based on the total weight of the adhesive composition.

It is preferable that the isocyanate compound is included in the content of 1.0 wt % or more, based on the total weight of the adhesive composition, so that sufficient cross-linking is made in the adhesive layer formed by the adhesive composition.

However, if the isocyanate compound is used in an excessive amount, due to excessive cross-linking reactions, the degree of cure of the adhesive layer may increase, and fatigue of tire cord may increase. Thus, it is preferable that the isocyanate compound is included in the content of 20.0 wt % or less, based on the total weight of the adhesive composition.

Meanwhile, in the adhesive composition for a tire cord, latex is included.

The latex is an adhesive component, and provides adhe-sive strength to the adhesive layer formed by the adhesive composition. Particularly, the latex improves affinity and adhesive strength between the adhesive layer and a rubber composition.

The latex may include one or more selected from the group consisting of a vinylpyridine-styrene-butadiene-based copolymer latex and a modified latex thereof, a styrene-butadiene latex and a modified latex thereof, a natural rubber latex, an acrylic acid ester copolymer latex, a butyl rubber latex, and a chloroprene rubber latex.

Preferably, as the latex, a latex prepared by dispersing the same kind of rubber component as used in the rubber composition for a tire in water or an organic solvent may be used.

As non-limiting examples, as the latex, commercially available products such as LM-60 from Denaka, VP-150 from APCOTEX, VB-1099 from Nippon A&L, 5218 and 0653 from Closlen, and the like may be used.

According to one example, the latex may be included in the adhesive composition for a tire cord in the content of 1.0 to 30.0 wt %.

Preferably, the latex may be included in the content of 1.0 wt % or more, or 5.0 wt % or more, or 10.0 wt % or more; and 30.0 wt % or less, or 25.0 wt % or less, or 20.0 wt % or less, or 16.0 wt % or less, based on the total weight of the adhesive composition.

Specifically, the latex may be included in the content of 1.0 to 30.0 wt %, or 1.0 to 25.0 wt %, or 1.0 to 20.0 wt %, or 1.0 to 16.0 wt %, or 5.0 to 30.0 wt %, or 5.0 to 25.0 wt %, or 5.0 to 20.0 wt %, or 5.0 to 16.0 wt %, or 10.0 to 30.0 wt %, or 10.0 to 25.0 wt %, or 10.0 to 20.0 wt %, or 10.0 to 16.0 wt %, based on the total weight of the adhesive composition.

It is preferable that the latex is included in the content of 1.0 wt % or more, based on the total weight of the adhesive composition, so that sufficient adhesive strength and rubber affinity may be exhibited in the adhesive layer formed by the adhesive composition.

However, if the latex is used in an excessive amount, the adhesive layer formed by the adhesive composition cannot be cured and may become very sticky, thus decreasing manufacture efficiency of a tire cord. Thus, it is preferable that the latex is included in the content of 30.0 wt % or less, based on the total weight of the adhesive composition.

Meanwhile, in the adhesive composition for a tire cord, water-dispersed polyurethane is included.

In general, polyurethane is prepared and distributed while being dissolved in an organic solvent. However, organic solvents are harmful to the human body and the environ-ment, and have a risk of fire. Thus, instead of organic solvent-based polyurethane, the water-dispersed polyure-thane, which is a water-based polyurethane, may be prefer-ably used.

Particularly, the water-dispersed polyurethane protects or captures an amine compound, which is a curing agent, thus allowing the adhesive layer formed by the adhesive com-position to be stably cured. Furthermore, the water-dispersed polyurethane has excellent affinity to rubber, thus allowing a rubber composition for a tire to be stably attached on the adhesive layer. And, the water-dispersed polyurethane may provide excellent abrasion resistance and elasticity to the adhesive layer.

The water-dispersed polyurethane may include, for example, 20 to 60 wt % of polyurethane and 40 to 80 wt % of water.

The polyurethane is a polymer compound having urethane bonds in the molecule, and generally, it may be formed by the reaction of a diisocyanate compound and a polyol.

The water-dispersed polyurethane may include one or more selected from the group consisting of a polycarbonate-based urethane, a polyester-based urethane, a polyacryl-based urethane, a polytetramethylene-based urethane, a polycaprolactone-based urethane, a polypropylene-based urethane, and a polyethylene-based urethane.

According to one example, the polyurethane included in the water-dispersed polyurethane may have weight average molecular weight (Mw) of 250,000 to 350,000 g/mol.

Specifically, the weight average molecular weight (Mw) of polyurethane may be 250,000 g/mol or more, or 255,000 g/mol or more, or 260,000 g/mol or more, or 265,000 g/mol or more, or 270,000 g/mol or more, or 275,000 g/mol or more, or 280,000 g/mol or more, or 285,000 g/mol or more, or 290,000 g/mol or more, or 295,000 g/mol or more, or 300,000 g/mol or more, or 305,000 g/mol or more.

And, the weight average molecular weight (Mw) of polyurethane may be, for example, 350.00 g/mol or less, or 345,000 g/mol or less, or 340,000 g/mol or less, or 335,000 g/mol or less, or 330,000 g/mol or less, or 325,000 g/mol or less, or 320,000 g/mol or less, or 315,000 g/mol or less, or 310,000 g/mol or less, or 305,000 g/mol or less, or 300,000 g/mol or less.

In case the above weight average molecular weight (Mw) range of polyurethane is fulfilled, adhesive strength, abrasion resistance, and elasticity according to the use of the water-dispersed polyurethane may be secured.

The preparation method of the water-dispersed polyurethane is not specifically limited as long as the above weight average molecular weight is fulfilled. For example, the water-dispersed polyurethane may be obtained by neutralizing a prepolymer having units derived from a polyester polyol, diol, and diisocyanate with a neutralizing agent, and then stirring with distilled water.

According to one example, the water-dispersed polyurethane may be included in the adhesive composition for a tire cord in the content of 0.5 to 10.0 wt %.

Preferably, the water-dispersed polyurethane may be included in the content of 0.5 wt % or more, or 1.0 wt % or more, or 1.5 wt % or more; and 10.0 wt % or less, or 8.0 wt % or less, or 5.0 wt % or less, based on the total weight of the adhesive composition for a tire cord.

Specifically, the water-dispersed polyurethane may be included in the content of 0.5 to 10.0 wt %, or 0.5 to 8.0 wt %, or 0.5 to 8.0 wt %, or 0.5 to 5.0 wt %, or 1.0 to 10.0 wt %, or 1.0 to 8.0 wt %, or 1.0 to 8.0 wt %, or 1.0 to 5.0 wt %, or 1.5 to 10.0 wt %, or 1.5 to 8.0 wt %, or 1.5 to 8.0 wt %, or 1.5 to 5.0 wt %, based on the total weight of the adhesive composition for a tire cord.

It is preferable that the water-dispersed polyurethane is included in the content of 0.5 wt % or more, based on the total weight of the adhesive composition for a tire cord, so that an adhesive strength improvement effect may be exhibited.

However, if the water-dispersed polyurethane is used in an excessive amount, the adhesive layer formed by the adhesive composition cannot be cured and may become very sticky, thus deteriorating the adhesive strength and durability of the adhesive layer. Thus, it is preferable that the water-dispersed polyurethane is included in the content of 10.0 wt % or less, based on the total weight of the adhesive composition for a tire cord.

Meanwhile, in the adhesive composition for a tire cord, an amine compound is included.

The amine compound functions as a curing agent. By the amine compound, curing of the adhesive composition may be achieved or accelerated, thus forming a stable adhesive layer by the adhesive composition.

The kind of the amine compounds is not specifically limited, and amine compounds known to be usable as a curing agent may be used. For example, the amine compound may include one or more selected from the group consisting of an aliphatic amine and an alicyclic amine.

As non-limiting examples, as the amine compound, commercial products such as Piperazine from DAEJUNG, G640 from Kukdo Chemical, HK511 from Huntsman, and the like may be used.

According to one example, the amine compound may be included in the adhesive composition for a tire cord in the content of 0.1 to 10.0 wt %.

Preferably, the amine compound may be included in the content of 0.1 wt % or more, or 0.2 wt % or more, or 0.3 wt % or more; and 10.0 wt % or less, or 5.0 wt % or less, or 3.0 wt % or less, or 2.5 wt % or less, or 2.0 wt % or less, or 1.5 wt % or less, or 1.0 wt % or less, based on the total weight of the adhesive composition for a tire cord.

Specifically, the amine compound may be included in the content of 0.1 to 10.0 wt %, or 0.1 to 5.0 wt %, or 0.1 to 3.0 wt %, or 0.1 to 2.5 wt %, or 0.1 to 2.0 wt %, or 0.1 to 1.5 wt %, or 0.1 to 1.0 wt %, or 0.2 to 10.0 wt %, or 0.2 to 5.0 wt %, or 0.2 to 3.0 wt %, or 0.2 to 2.5 wt %, or 0.2 to 2.0 wt %, or 0.2 to 1.5 wt %, or 0.2 to 1.0 wt %, or 0.3 to 10.0 wt %, or 0.3 to 5.0 wt %, or 0.3 to 3.0 wt %, or 0.3 to 2.5 wt %, or 0.3 to 2.0 wt %, or 0.3 to 1.5 wt %, or 0.3 to 1.0 wt %, based on the total weight of the adhesive composition for a tire cord.

It is preferable that the amine compound is included in the content of 0.1 wt % or more, based on the total weight of the adhesive composition for a tire cord, so that curing of the adhesive composition may be sufficiently achieved.

However, if the amine compound is used in an excessive amount, due to excessive curing, the adhesive strength of the adhesive layer formed by the adhesive composition may be deteriorated. Thus, it is preferable that the amine compound is included in the content of 10.0 wt % or less, based on the total weight of the adhesive composition for a tire cord.

Meanwhile, in the adhesive composition for a tire cord, a solvent is included.

Preferably, water ($H_2O$) may be used as the solvent.

More preferably, demineralized water, distilled water, and the like may be used as the solvent.

According to one example, the solvent is included in the adhesive composition for a tire cord in the content of 60.0 to 85.0 wt %.

Preferably, the solvent may be included in the content of 60.0 wt % or more, or 65.0 wt % or more, or 70.0 wt % or more; and 85.0 wt % or less or 80.0 wt % or less, based on the total weight of the adhesive composition for a tire cord.

Specifically, the solvent may be included in the content of 60.0 to 85.0 wt %, or 60.0 to 80.0 wt %, or 65.0 to 85.0 wt %, or 65.0 to 80.0 wt %, or 70.0 to 85.0 wt %, or 70.0 to 80.0 wt %, or 70.0 to 75.0 wt %, or 65.0 to 70.0 wt %, based on the total weight of the adhesive composition for a tire cord.

It is preferable that the solvent is included in the content of 60.0 wt % or more, based on the total weight of the adhesive composition for a tire cord, so as to secure mixing and dispersibility of solid contents.

However, if the solvent is used in an excessive amount, it may be difficult to form an adhesive layer by the adhesive composition, and it may take a long time to dry. Thus, it is preferable that the solvent is included in the content of 85.0 wt % or less, based on the total weight of the adhesive composition for a tire cord.

As one example, the content of water in the total composition may mean the content of water mixed as a solvent.

As another example, the content of water in the total composition may mean not only the content of water mixed as a solvent, but also the content of water mixed in other components such as the water-dispersed polyurethane.

In addition, the adhesive composition for a tire cord may further include common additives such as a chain extender, a dispersant, a heat stabilizer, and the like.

The adhesive composition for a tire cord may have relative viscosity measured using an Ubbelohde viscometer at 25° C. of 2.0 to 3.0. Preferably, the adhesive composition for a tire cord may have relative viscosity measured using an Ubbelohde viscometer at 25° C. of 2.00 or more, or 2.20 or more; and 3.00 or less, or 2.85 or less, or 2.80 or less, or 2.77 or less, or 2.75 or less, or 2.70 or less.

Specifically, the adhesive composition for a tire cord may have relative viscosity measured using an Ubbelohde viscometer at 25° C. of 2.00 to 3.00, or 2.00 to 2.85, or 2.00 to 2.80, or 2.00 to 2.77, or 2.00 to 2.75, or 2.00 to 2.70, or 2.20 to 3.00, or 2.20 to 2.85, or 2.20 to 2.80, or 2.20 to 2.77, or 2.20 to 2.75, or 2.20 to 2.70.

By fulfilling the above viscosity range of the adhesive composition for a tire cord, when manufacturing a tire cord, an appropriate pick rate may be secured, processability and productivity may be improved, and excellent adhesive strength may be provided.

Meanwhile, according to another embodiment of the invention, there is provided a tire cord including:

a fiber substrate; and an adhesive layer formed on the fiber substrate, and formed from the above explained adhesive composition for a tire cord.

For the details of the adhesive composition for a tire cord, the above explanations are applied.

The adhesive composition for a tire cord does not include an RF resin or components derived therefrom, and thus is environment-friendly. Particularly, the adhesive composition for a tire cord can not only improve adhesive strength between tire rubber and a tire cord, but can also improve strength of a tire cord.

As the fiber substrate, those commonly used as a tire cord in the technical field to which the invention pertains may be used without specific limitations.

For example, the fiber substrate may be a raw cord including a polyester fiber.

The adhesive layer may be formed by dipping the fiber substrate in the adhesive composition for a tire cord, or spraying the adhesive composition for a tire cord to the fiber substrate.

The adhesive layer may be formed with an appropriate thickness such that adhesive strength between tire rubber and a tire cord may be improved without hindering the properties of the fiber substrate.

When manufacturing the tire cord, a method of providing the adhesive composition for a tire cord on the fiber substrate, drying and curing conditions, and the like may be changed as necessary, within common ranges.

According to one example, a method of preparing the tire cord may include: a first coating step wherein the fiber substrate is dipped in the first coating solution and dried to form a first coating layer on the fiber substrate; and a second coating step wherein the first coated fiber substrate is dipped in the second coating solution and dried to form a second coating layer on the first coating layer.

The first coating solution includes the reaction product between the epoxy resin and the diol compound, and the isocyanate. The first coating layer formed by the first coating solution provides adhesion functional groups to the fiber substrate.

The fiber substrate treated with the first coating solution is heat treated at a temperature of 100 to 160° C. for 30 to 150 seconds, and thus is dried. Thereby, a first coating layer is formed on the fiber substrate. Subsequently, the fiber substrate is heat treated at a temperature of 200 to 260° C. for 30 to 150 seconds, and thus is cured. By the heat treatment, the first coating layer may be stably formed on the fiber substrate.

The second coating solution is the above explained adhesive composition for a tire cord.

The first coated fiber substrate is dipped in the second coating solution and heat treated at a temperature of 100 to 160° C. for 30 to 150 seconds, and thus is dried. Thereby, a second coating layer is formed on the first coating layer. Subsequently, the fiber substrate is heat treated at a temperature of 200 to 260° C. for 30 to 150 seconds, and thus is cured. By the heat treatment, the second coating layer may be stably formed on the first coating layer.

Meanwhile, according to yet another embodiment of the invention, there is provided a tire including the above explained tire cord.

The tire may have a common construction, except including the above explained tire cord.

For example, the tire may include: a tread part; one pair of shoulder parts respectively continued to both sides around the tread part; one pair of side wall parts continued to each shoulder part; one pair of bead parts respectively continued to each side wall part; a carcass layer formed inside the tread part, shoulder parts, side wall parts, and bead parts; a cord positioned inside the carcass layer; a belt part positioned between the inside surface of the tread part and the carcass layer; and an inner liner bonded to the inside of the carcass layer.

Advantageous Effects

According to the present disclosure, an environment-friendly adhesive composition for a tire cord that can not only improve adhesive strength between tire rubber and a tire cord, but also improve strength of a tire cord, is provided.

DETAILED DESCRIPTION OF THE EMBODIMENTS

This invention will be explained in more detail in the following examples. However, these examples are presented only for illustration of the invention, and the scope of the invention is not limited thereby.

Preparation Example A (Preparation of Reaction Products Between Epoxy Resin and Diol Compound)

An epoxy resin (EX614B from NAGASE) and diol compounds were mixed at the weight ratios described in the following Tables 1 to 3, and stirred at room temperature (20° C.) for 2 hours to obtain the reaction products #1 to #14. #C1 is an epoxy resin (EX614B from NAGASE) that is not reacted with a diol compound.

TABLE 1

| Preparation Example No. | #1 | #2 | #3 | #4 | #5 |
|---|---|---|---|---|---|
| epoxy | 1.2 | 1.2 | 1.2 | 1.2 | 1.2 |
| diol | 1,4-butanediol | 1,3-propanediol | 1,6-hexanediol | 1,3-butanediol | 2,3-butanediol |
| | 0.6 | 0.6 | 0.6 | 0.6 | 0.6 |
| weight ratio (epoxy:diol) | 1:0.5 | 1:0.5 | 1:0.5 | 1:0.5 | 1:0.5 |
| Mw (g/mol) | 737 | 730 | 751 | 737 | 737 |

TABLE 2

| Preparation Example No. | #6 | #7 | #8 | #9 | #10 |
|---|---|---|---|---|---|
| epoxy | 1.2 | 1.2 | 1.2 | 1.2 | 1.2 |
| diol | 1,4-butanediol | 1,4-butanediol | 1,4-butanediol | 1,4-butanediol | 1,4-butanediol |
| | 1.2 | 1.8 | 2.4 | 3.0 | 3.6 |
| weight ratio (epoxy:diol) | 1:1 | 1:1.5 | 1:2 | 1:2.5 | 1:3 |
| Mw (g/mol) | 782 | 827 | 872 | 917 | 962 |

TABLE 3

| Preparation Example No. | #11 | #12 | #13 | #14 | #C1 |
|---|---|---|---|---|---|
| epoxy | 1.2 | 1.2 | 1.2 | 1.2 | 1.2 |
| diol | 1,4-butanediol | 1,4-butanediol | 1,4-butanediol | 1,4-butanediol | — |
| | 4.2 | 4.8 | 5.4 | 6.0 | 0 |
| weight ratio (epoxy:diol) | 1:3.5 | 1:4 | 1:4.5 | 1:5 | 1:0 |
| Mw (g/mol) | 1007 | 1052 | 1097 | 1143 | 692 |

Preparation Example B (Preparation of Water-Dispersed Polyurethane)

A polyester polyol (weight average molecular weight 2000 g/mol), a diol (1,6-hexanediol), and ionomers (dimethylol butanoic acid) were introduced into a reactor at the mole ratio of 1:0.2:0.8, and mixed at 75±5° C. and atmospheric pressure for 4 hours to obtain a mixture. Methylene diphenyl diisocyanate (MDI) was added to the mixture at the mole ratio of 1:2 based on the polyester polyol, and reacted for 2 hours to prepare a polyurethane prepolymer. The reaction temperature of the prepared polyurethane prepolymer was lowered to 60° C. and a neutralizing agent (triethanolamine, TEA) was introduced in a solvent (acetone) to disperse. In the neutralized polyurethane prepolymer, distilled water was introduced such that solid content became 60 wt %, and stirred. And, a chain extender (ethylene diamine) was added at the mole ratio of 1:1 based on the polyester polyol, and stirred to obtain water-dispersed polyurethane (weight average molecular weight: 308,000 g/mol).

Example 1~14 and Comparative Example 1

(Preparation of Adhesive Compositions for a Tire Cord)

The components were mixed at the content (wt %) as described in the following Tables 4, 5, and 6, and stirred at room temperature (20° C.) for 24 hours to prepare each adhesive composition of Examples 1~14 and Comparative Example 1.

In the following Table 4 to Table 6, each component marked with a letter is as follows.

E: reaction product between the epoxy and diol compound resin according to Preparation Example A, or epoxy resin I: isocyanate compound (IL-6 from EMS, caprolactam-blocked 4,4'-MDI)

L: latex (0653 from Closlen, vinylpyridine-styrene-butadiene-based copolymer)

U: water-dispersed polyurethane according to Preparation Example B

A: amine compound (Piperazine from DAEJUNG)

S: solvent (demineralized water)

TABLE 4

| wt % | Example 1 | Example 2 | Example 3 | Example 4 | Example 5 |
|---|---|---|---|---|---|
| E (Preparation Example No.) | 1.8 (#1) | 1.8 (#2) | 1.8 (#3) | 1.8 (#4) | 1.8 (#5) |
| I | 3.9 | 3.9 | 3.9 | 3.9 | 3.9 |
| L | 15.6 | 15.6 | 15.6 | 15.6 | 15.6 |
| U | 2 | 2 | 2 | 2 | 2 |
| A | 0.4 | 0.4 | 0.4 | 0.4 | 0.4 |
| S | 76.3 | 76.3 | 76.3 | 76.3 | 76.3 |

TABLE 5

| wt % | Example 6 | Example 7 | Example 8 | Example 9 | Example 10 |
|---|---|---|---|---|---|
| E (Preparation Example No.) | 2.4 (#6) | 3.0 (#7) | 3.6 (#8) | 4.2 (#9) | 4.8 (#10) |
| I | 3.9 | 3.9 | 3.9 | 3.9 | 3.9 |
| L | 15.6 | 15.6 | 15.6 | 15.6 | 15.6 |
| U | 2 | 2 | 2 | 2 | 2 |
| A | 0.4 | 0.4 | 0.4 | 0.4 | 0.4 |
| S | 75.7 | 75.1 | 74.5 | 73.9 | 73.3 |

TABLE 6

| wt % | Example 11 | Example 12 | Example 13 | Example 14 | Comparative Example 1 |
|---|---|---|---|---|---|
| E (Preparation Example No.) | 5.4 (#11) | 6.0 (#12) | 6.6 (#13) | 7.2 (#14) | 1.2 (#C1) |
| I | 3.9 | 3.9 | 3.9 | 3.9 | 3.9 |
| L | 15.6 | 15.6 | 15.6 | 15.6 | 15.6 |

TABLE 6-continued

| wt % | Example 11 | Example 12 | Example 13 | Example 14 | Comparative Example 1 |
|---|---|---|---|---|---|
| U | 2 | 2 | 2 | 2 | 2 |
| A | 0.4 | 0.4 | 0.4 | 0.4 | 0.4 |
| S | 72.7 | 72.1 | 71.5 | 70.9 | 76.9 |

Comparative Example 2

(Preparation of an Adhesive Composition for a Tire Cord)

An adhesive composition was prepared by the same method as Example 1, except that 1.2 wt % of an epoxy resin (EX614B from NAGASE) and 0.6 wt % of 1,4-butanediol were added together with the I, L, U, A, and S components and stirred, instead of 1.8 wt % of "the reaction product between the epoxy resin and the diol compound" (E component) according to #1 of Preparation Example A in Example 1.

Comparative Example 3

(Preparation of an Adhesive Composition for a Tire Cord)

An adhesive composition was prepared by the same method as Example 1, except that 1.8 wt % of 1,6-hexane-diol-diglycidylether was added together with the I, L, U, A, and S components and stirred, instead of 1.8 wt % of "the reaction product between the epoxy resin and the diol compound" (E component) according to #1 of Preparation Example A in Example 1.

Manufacture of Tire Cord 2 strands of first twist yarns (Z-direction) with a twist number of 360 TPM were prepared using a polyester yarn. The two strands of first twist yarns were secondarily twisted (S-direction) together at the twist number of 360 TPM to prepare a ply yarn (1650 dtex/2 ply). The ply yarn thus prepared was used as a raw cord.

The raw cord was dipped in the adhesive composition of examples or comparative examples, and then heat treated at a drying temperature of 150° C. and a curing temperature of 243° C., respectively for 1 minute, thus preparing a tire cord specimen including an adhesive layer formed on the raw cord.

Experimental Example (1) The relative viscosity of each composition of examples and comparative examples prepared above was measured in a constant temperature water tank of 25° C. using an Ubbelohde viscometer. Before measuring the relative viscosity, a certain amount of demineralized water was introduced into the Ubbelohde viscometer, and then the viscosity of demineralized water was measured.

Based on the measured viscosity of demineralized water, relative viscosity (R.V.) of each adhesive composition of examples and comparative examples is measured.

(2) For each tire cord specimen having an adhesive layer formed by the adhesive compositions of examples and comparative examples, adhesive strength per unit area was evaluated according to the ASTM D4393 standard test method.

Specifically, a rubber sheet with a thickness of 0.6 mm, the tire cord specimen, a rubber sheet with a thickness of 0.6 mm, the tire cord specimen, and a rubber sheet with a thickness of 0.6 mm were sequentially stacked, and vulcanized at a pressure of 60 kg/cm² at 170° C. for 15 minutes to manufacture a sample. The sample was cut to prepare a specimen having a width of 1 inch. For reference, the rubber sheet is a sheet used in a carcass constituting a tire. By using a laminate using such a rubber sheet, adhesive strength of tire cord to a carcass layer can be confirmed.

For the prepared specimen, a peel strength test was conducted at 25° C., at a speed of 125 mm/min, using universal testing machine (Instron) to measure adhesive strength of tire cord to a carcass layer, and an average value of three loads generated during peeling was determined as adhesive strength. The measured value was normalized to the value of an adhesive layer formed by the adhesive composition of Example 1, and the results are shown in the following Tables 7 and 8.

(3) For the tire cord specimen having an adhesive layer formed by each adhesive composition of examples and comparative examples, tire cord strength and stiffness were evaluated according to the ASTM D883/D885M standard test method. The measure value was normalized to the value of the adhesive layer formed by the adhesive composition of Example 1, and the results are shown in the following Tables 7 and 8.

TABLE 7

| | Relative viscosity (R.V.) | Adhesive strength (%) | Stiffness (%) | Strength (%) |
|---|---|---|---|---|
| Example 1 | 2.24 | 100 | 100 | 100 |
| Example 2 | 2.26 | 98 | 105 | 94 |
| Example 3 | 2.33 | 96 | 94 | 102 |
| Example 4 | 2.21 | 97 | 102 | 97 |
| Example 5 | 2.23 | 95 | 106 | 95 |
| Example 6 | 2.29 | 99 | 97 | 103 |
| Example 7 | 2.32 | 98 | 94 | 104 |
| Example 8 | 2.41 | 98 | 92 | 106 |
| Example 9 | 2.48 | 97 | 89 | 108 |
| Example 10 | 2.53 | 96 | 88 | 108 |
| Example 11 | 2.55 | 95 | 84 | 108 |
| Example 12 | 2.61 | 95 | 81 | 109 |
| Example 13 | 2.63 | 95 | 79 | 109 |
| Example 14 | 2.77 | 94 | 78 | 109 |

TABLE 8

| | Relative viscosity (R.V.) | Adhesive strength (%) | Stiffness (%) | Strength (%) |
|---|---|---|---|---|
| Comparative Example 1 | 2.14 | 87 | 124 | 79 |
| Comparative Example 2 | 2.01 | 71 | 113 | 81 |
| Comparative Example 3 | 2.11 | 59 | 40 | 98 |

Referring to the above Table 7 and Table 8, it is confirmed that tire cords including adhesive layers formed by the adhesive compositions according to the examples not only have excellent adhesive strength to tire rubber, but also exhibit improved strength.

The invention claimed is:

1. An adhesive composition for a tire cord, comprising:
   a reaction product of an epoxy resin and a diol compound;
   an isocyanate compound;
   latex;

water-dispersed polyurethane;

an amine compound; and a solvent, wherein the reaction product is formed by reaction between the epoxy resin and the diol compound at a weight ratio of 1:0.1 to 1:5, and the reaction product has a weight average molecular weight of 700 to 1200 g/mol, wherein the diol compound comprises one or more selected from the group consisting of 1,3-propanediol, 1,4-butanediol, 1,3-butanediol, 2,3-butanediol, and 1,6-hexanediol.

2. The adhesive composition for a tire cord according to claim 1, wherein the composition comprises:

0.5 to 10.0 wt % of the reaction product;

1.0 to 20.0 wt % of the isocyanate compound;

1.0 to 30.0 wt % of the latex;

0.5 to 10.0 wt % of the water-dispersed polyurethane;

0.1 to 10.0 wt % of the amine compound; and 60.0 to 85.0 wt % of the solvent.

3. The adhesive composition for a tire cord according to claim 1, wherein the epoxy resin comprises one or more selected from the group consisting of a bisphenol-based epoxy resin, a novolac-based epoxy resin, and an oxazolidone-based epoxy resin.

4. The adhesive composition for a tire cord according to claim 1, wherein the isocyanate compound comprises one or more selected from the group consisting of methylene diphenyl diisocyanate, toluene diisocyanate, and hexamethylene diisocyanate.

5. The adhesive composition for a tire cord according to claim 1, wherein the latex comprises one or more selected from the group consisting of a vinylpyridine-styrene-butadiene-based copolymer latex and a modified latex thereof, a styrene-butadiene latex and a modified latex thereof, a natural rubber latex, an acrylic acid ester copolymer latex, a butyl rubber latex, and a chloroprene rubber latex.

6. The adhesive composition for a tire cord according to claim 1, wherein the water-dispersed polyurethane comprises one or more selected from the group consisting of a polycarbonate-based urethane, a polyester-based urethane, a polyacryl-based urethane, a polytetramethylene-based urethane, a polycaprolactone-based urethane, a polypropylene-based urethane, and a polyethylene-based urethane.

7. The adhesive composition for a tire cord according to claim 1, wherein the amine compound comprises one or more selected from the group consisting of an aliphatic amine and an alicyclic amine.

8. The adhesive composition for a tire cord according to claim 1, wherein the solvent is water.

9. The adhesive composition for a tire cord according to claim 1, wherein the composition has a relative viscosity measured using an Ubbelohde viscometer at 25° C. of 2.0 to 3.0.

10. A tire cord comprising:

a fiber substrate; and an adhesive layer formed on the fiber substrate, and formed from the adhesive composition for a tire cord of claim 1.

11. The tire cord according to claim 10, wherein the fiber substrate is a raw cord comprising a polyester fiber.

12. A tire comprising the tire cord of claim 10.

* * * * *